Patented Apr. 15, 1969

3,438,768
SEPARATION OF COBALT FROM NICKEL BY EXTRACTION FROM AMMONIACAL SOLUTION
Allan W. Ashbrook, Ottawa, Ontario, and Gordon M. Ritcey, Bell's Corners, Ontario, Canada, assignors to Eldorado Mining and Refining Limited, Ottawa, Ontario, Canada, a company of Canada
No Drawing. Filed June 21, 1965, Ser. No. 465,750
Int. Cl. C22b 23/04
U.S. Cl. 75—119                              8 Claims

ABSTRACT OF THE DISCLOSURE

A process for separating cobalt from nickel in an ammoniacal leach solution containing cobalt and nickel in which the cobalt is oxidized to the cobaltic form and the solution is then contacted with di(2-ethylhexyl) phosphoric acid dissolved in an inert organic solvent, whereby the cobalt values are selectively extracted into the organic phase and the resultant cobalt loaded organic phase is separated from the remaining aqueous phase containing the nickel.

---

This invention relates to the separation of cobalt from nickel in an ammoniacal solution in which they are dissolved and more particularly to a process in which an organo phosphoric acid compound is used as solvent in the liquid-liquid separation of cobalt and nickel from ammoniacal solutions.

Processes are known for separating cobalt and nickel from ammoniacal solutions, e.g., United States Patent 3,107,996, in which ores containing cobalt and nickel are reduced in a furnace, the calcined ores are leached in an ammoniacal solution to extract the nickel and the cobalt, and finally extracting the nickel and cobalt from the product liquor. The extraction was carried out by distilling the solution until a substantial amount of the cobalt in the solution in cobaltous form was selectively precipitated.

It has now been found that cobalt can be preferentially extracted from ammoniacal solutions by liquid-liquid separation. According to the process of the invention the ammoniacal solution is first oxidized to convert any cobalt in the solution in cobaltous form into the cobaltic form. The thus treated solution is then subjected to liquid-liquid solvent extraction with a solvent extraction reagent comprising an organo phosphoric acid or an alkali or ammonia salt thereof dissolved in an inert organic solvent. During the extraction the organic phase becomes preferentially loaded with cobalt while the nickel remains in the raffinate.

The two phases are then separated and the organic phase, containing the cobalt, is scrubbed to remove occluded nickel. After scrubbing the cobalt is stripped from the organic phase by acid treatment. The nickel is removed from the original raffinate by any suitable technique e.g., crystallization.

The process used according to the present invention provides a very simple and economical process whereby cobalt and nickel values are recovered from nickel and cobalt bearing solution ions in a relatively pure state and in good yield.

The solvent extraction reagent which can be used according to this invention is advantageously an organo phosphoric acid compound of the following formula

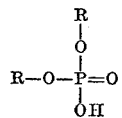

where R is selected from the group consisting of alkyl, aryl, and aralykyl radicals and wherein one R group may be hydrogen. Since the compound must be substantially water-immiscible, the total number of carbon atoms in the molecule should be sufficient to render the compound substantially insoluble. Generally at least 8 carbon atoms should be present in each group with at least 12 carbon atoms in the phosphoric acid molecule. R of course can be substituted with a variety of groups such as alkoxy, halogens, etc., and R can be saturated or unsaturated or interrupted by hetero atoms so long as there is no interference in the performance of the organic phosphate compound in extracting cobalt ions from the aqueous phase to the organic phase. It is only necessary that the organic phosphate, in addition to its extracting function, be soluble in organic diluents and have sufficient carbon atoms to render the compound insoluble in water.

Various organophosphoric acid compounds can be advantageously used according to this invention and these compounds include di(2-ethylhexyl) phosphoric acid, heptadecylphosphoric acid, dodecylphosphoric acid, di(1-methylheptyl) phosphoric acid, diisooctylphosphoric acid, di(2-ethyl-4-methylpentyl) phosphoric acid, di(2-propyl-4-methyl-pentyl) phosphoric acid, octylphenyl phosphoric acid, the isooctyl or stearyl derivatives of alkyl acid phosphates, and the like.

The alkali or ammonia salts of the above compounds may also be used e.g., sodium or potassium salts of dialkyl-phosphoric acid. Generally these compounds again should contain at least 12 carbon atoms in order to render them substantially water-in-soluble. Generally about 2–30% by volume of organophosphoric acid compound is used.

A wide variety or organic diluents in which the extraction reagent is dissolved, can be employed according to this invention. The minimum requirements for the diluent, however, are that the diluent be substantially water-immiscible, that it will dissolve the extraction reagent, and that it will not interfere with the function of the reagent in extracting the cobalt values from aqueous cobalt and nickel bearing solutions. These diluents can be aliphatic or aromatic hydrocarbons, halogenated hydrocarbons, petroleum derivatives, ethers, etc. Examples of these various diluents include toluene, carbon tetra-chloride, benzene chloroform, 2-ethyl-hexanol, and particularly kerosene.

It has also been found to be desirable to incorporate an additive in the solvent mixture to inhibit emulsions and assist in phase separation. About 3–5% tributyl phosphate or isodecanol has been found to be particularly suitable for this purpose.

Contacting the cobalt and nickel bearing aqueous solution with the solvent extraction reagent may be carried out by any of the well-known procedures employed in solvent-solvent extractions. Although continuous counter-current methods are preferred, batch, continuous batch, and batch countercurrent methods are also useful. Any suitable liquid-liquid contacting means may be employed such as a pulse column, a countercurrent rotating disc column, and the like. The temperature at which the mixing is carried out is not critical but advantageously the temperature is maintained at about 20° C. to 40° C.

The ratio of the volume of the organic phase to the aqueous phase can be varied considerably and the most efficient ratio in each case can be readily determined by one skilled in the art. The particular ratio selected for any given extraction may depend upon the extraction reagent, diluent, and type of cobalt and nickel bearing solution employed as well as their concentration and the method of mixing them, etc. Countercurrent methods are usually desirable when the ratio of the organic phase to the aqueous phase is relatively low.

After the cobalt values have been transferred to the organic phase and the aqueous and organic phases separated, the organic phase is transferred to a scrubber of known design. In the scrubber the cobalt containing organic phase is advantageously scrubbed with a 5-50 w/o cobalt sulfate solution as cobaltic amine sulfate in ammoniacal solution at about pH 11.

After the scrubbing, the cobalt containing organic phase is transferred from the scrubber to a stripping circuit, which can be any suitable liquid-liquid contactor. In the stripping circuit the cobalt containing organic phase is advantageously contacted with about 1-5 N mineral acid, e.g., sulfuric, nitric or hydrochloric acid, the choice of acid depending on the cobalt salt required. Further details on stripping can be found in a copending application of G. M. Ritcey and A. W. Ashbrook filed on same date.

The cobalt and nickel containing ammoniacal solution normally contains about 0.1-50 g./l. of cobalt and about 0.1-50 g./l. of nickel, while the loaded organic phase obtained usually contains about 5-25 g./l. of cobalt and less than 0.1 g./l. nickel. After scrubbing the organic phase contains about 5-25 g./l. cobalt and less than 0.01 g./l. nickel.

The ammoniacal solution is prepared by first leaching the ore containing the metals with ammonia or acid. Nitric or sulfuric acid has been found to be the most suitable for the leaching step. After leaching, the leach slurry is filtered to obtain a solution containing cobalt and nickel in the form of a sulfate, chloride, nitrate or carbonate. The pH of this solution is adjusted to about 11 with ammonia and then air or oxygen is bubbled through the ammoniacal solution thus obtained to oxidize the cobaltous ammine in the solution into cobaltic ammine.

The process of this invention was used to recover cobalt and nickel from refinery residues. A typical residue had the following analysis:

TABLE A

| Element | Percent (wt. dry basis) |
|---|---|
| Ag | 0.006 |
| As | 2.2 |
| Bi | 0.26 |
| Cl | 0.02 |
| Co | 1.76 |
| Co$_3$ | 10.1 |
| Cu | 2.20 |
| Fe | 5.33 |
| Ni | 0.90 |
| U | 0.25 |

The remainder of the residue consisted mainly of Si, Al, Mg and Ca as oxides.

The invention will now be exemplified by the following non-limitative examples.

EXAMPLE 1

(a) Preparation of solution

An ore residue of the type described in Table A above was leached at normal temperatures with H$_2$SO$_4$ at a pH of 1.5-2.0. Impurities and undesirable elements were removed by control of the pH of the leach solution, e.g., by precipitation of iron and aluminum at a pH of 4.5-5.5, to yield a solution of the following analysis:

| | G./l. |
|---|---|
| Cobalt | 1.5 |
| Nickel | 2.0 |
| Sulphate | 16.7 |

The pH of the solution was then raised to 11.5 by the addition of ammonium hydroxide and the ammoniacal solution was oxidized by bubbling oxygen through the solution to convert all cobalt values to cobaltic ammine.

(b) Equipment

Extraction studies were conducted in a two inch diameter glass pulse column. The column had a pulse zone 15 feet in length and contained in the pulse zone perforated discs spaced 2 inches apart. A denver pulse pump was used to pulsate the liquid in the column.

(c) Extraction

A leach solution prepared according to part (a) was fed to the top of a pulse column as described in part (b) while an organic feed was fed to the bottom of the column. The organic feed was a 0.3 molar solution of di(2-ethylhexyl) phosphoric acid in Shell 140 flash naphtha containing 5v/o of tributyl phosphate.

The column was operated at a pulse rate of 25 pulses/min. and a pulse amplitude of 1.5 inches. The flow rates and yields were as indicated in the following table:

| Time, hrs. | Flow rate | | Extract | | S.G. | Raffinate | |
|---|---|---|---|---|---|---|---|
| | Aqu., ml./min. | Org., ml./min. | Co, g./l. | Ni, g./l. | | Co, g./l. | Ni, g./l. |
| 1 | 200 | 100 | 7.1 | 1.3 | 0.848 | 0.04 | 1.3 |
| 2 | 200 | 100 | 4.5 | 2.2 | 0.844 | 0.04 | 1.1 |
| 3 | 200 | 100 | 4.0 | 1.8 | 0.841 | 0.06 | 1.4 |
| 4 | 200 | 70 | 4.2 | 1.8 | 0.842 | <0.01 | 1.6 |
| 5 | 500 | 50 | 7.8 | 0.3 | 0.844 | 0.02 | 2.1 |
| 5.5 | 500 | 50 | 9.5 | 0.2 | | | |

(d) Scrubbing

The effect of scrubbing a loaded extract containing copper, nickel and cobalt with a strong (e.g., 44 g./l. cobalt) ammoniacal cobalt solution at pH 11, aqueous/organic ratio 1:1 and at room temperature is shown below:

| No. of contacts | Extract before scrubbing (g./l.) | | | Scrubbed extract (g./l.) | | |
|---|---|---|---|---|---|---|
| | Copper | Nickel | Cobalt | Copper | Nickel | Cobalt |
| 1 | 2.7 | 1.4 | 4.3 | <0.1 | 0.1 | 10.0 |
| 2 | | | | <0.1 | <0.1 | 10.0 |
| 3 | | | | <0.1 | <0.1 | 10.2 |
| 1 | | 1.3 | 5.5 | | 0.09 | 5.5 |
| 2 | | | | | <0.1 | 9.3 |
| 3 | | | | | <0.1 | 9.4 |

(e) Stripping

A series of stripping tests were conducted on an extract containing 3.5 g./l. cobalt, 1.2 g./l. copper and 1.1 g./l. nickel. Sulfuric acid solutions over the range of 2-20 volume percent sulfuric acid were used, with an aqueous to organic ratio of 1:1 and a contact time of 2 minutes. The results of these tests are as follows:

| Strip solution | | Loaded strip solution | | |
|---|---|---|---|---|
| H$_2$SO$_4$, vol. percent | SO$_4$, g./l. | Cu, g./l. | Ni, g./l. | Co, g./l. |
| 2 | 40 | 0.7 | 1.0 | 2.6 |
| 4 | 74 | 1.1 | 1.1 | 3.2 |
| 6 | 105 | 1.1 | 1.1 | 3.5 |
| 8 | 126 | 1.1 | 1.1 | 3.3 |
| 10 | 162 | 1.1 | 1.1 | 3.6 |
| 12 | 196 | 1.1 | 1.1 | 3.4 |
| 14 | 261 | 1.1 | 1.0 | 3.5 |
| 16 | 298 | 1.0 | 1.1 | 3.9 |
| 18 | 278 | 1.1 | 1.0 | 3.7 |
| 20 | 306 | 1.1 | 1.0 | 3.2 |

We claim:
1. A process for separating cobalt from nickel in an ammoniacal leach solution containing cobalt and nickel, the cobalt being in the cobaltic form, which comprises contacting said solution with a compound selected from an organophosphoric acid having the formula:

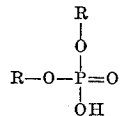

and alkali and ammonia salts thereof, wherein R is selected from the group consisting of hydrogen, alkyl, aryl, and aralkyl and wherein not more than one R is hydrogen, each R group other than hydrogen containing at least 8 carbon atoms and the phosphoric acid molecule containing at least 12 carbon atoms, said salt being dissolved in an inert organic solvent, whereby the cobalt values are extracted from the aqueous phase to the organic phase, and separating the resultant cobalt loaded organic phase from the remaining aqueous phase.

2. The process of claim 1 in which the organophosphoric acid is di(2-ethylhexyl) phosphoric acid.

3. The process of claim 1 in which the organic solvent is selected from the group consisting of kerosene and naphtha.

4. The process of claim 1 in which the organic solvent contains an emulsion inhibitor.

5. A process for separating cobalt from nickel in an ammoniacal leach solution containing said metals, the cobalt being in the cobaltic form, which comprises contacting said solution with an extraction solvent comprising a substantially water-immiscible organic solvent containing 2 to 30% by volume of di(2-ethylhexyl) phosphoric acid and 3–5% by volume of an emulsion inhibitor selected from tributyl phosphate and isodecanol, whereby the cobalt values are extracted from the aqueous phase to the organic phase, separating the resultant cobalt loaded organic phase from the remaining aqueous phase, scrubbing the cobalt loaded organic phase with a 5–50% by weight cobalt sulfate solution as cobaltic ammine sulphate in ammoniacal solution to remove occluded nickel and acid stripping the scrubbed organic phase with about 1–5 N mineral acid to free the cobalt in the form of a salt.

6. The process of claim 5 in which the acid leach solution contains about 0.1–50 g./l. of cobalt and about 0.1–50 g./l. of nickel.

7. The process of claim 5 in which the pH of the leach solution is adjusted to about 11 with ammonia and oxygen is bubbled through the ammoniacal solution to oxidize any cobaltous ammine to cobaltic ammine.

8. The process of claim 5 in which the scrubbing takes place at about pH 11.

References Cited

UNITED STATES PATENTS

| | | | |
|---|---|---|---|
| 3,193,381 | 7/1965 | George et al. | 75—108 |
| 3,052,514 | 9/1962 | Schmitt | 23—312 |
| 3,276,863 | 10/1966 | Drobnick et al. | 75—108 |
| 3,082,081 | 3/1963 | Howe et al. | 75—119 |

L. DEWAYNE RUTLEDGE, *Primary Examiner.*

TERRY R. FRYE, *Assistant Examiner.*

U.S. Cl. X.R.

75—103